(12) United States Patent
De Ugarte et al.

(10) Patent No.: US 8,834,120 B2
(45) Date of Patent: Sep. 16, 2014

(54) METHOD FOR CONNECTING A LOW SPEED MAIN SHAFT OF A WIND TURBINE TO AN INPUT SHAFT OF A TRANSMISSION GEARBOX OF THE WIND TURBINE AND A CONNECTION OBTAINED BY SAID METHOD

(75) Inventors: Patrik Saenz De Ugarte, Leioa (ES); Javier Barañano Etxebarria, Durango (ES); Wim De Laet, Antwerp (BE)

(73) Assignees: Hansen Transmissions International N.V., Kontich (BE); Gamesa Innovation & Technology S.L., Sarriguren-Pamplona (ES)

( * ) Notice: Subject to any disclaimer, the term of this patent is extended or adjusted under 35 U.S.C. 154(b) by 1035 days.

(21) Appl. No.: 12/336,074

(22) Filed: Dec. 16, 2008

(65) Prior Publication Data

US 2009/0233721 A1 Sep. 17, 2009

(30) Foreign Application Priority Data

Dec. 28, 2007 (EP) .................................... 07076134

(51) Int. Cl.
*F16D 7/02* (2006.01)
*F03D 11/02* (2006.01)
*F03D 11/00* (2006.01)
*F16H 1/28* (2006.01)

(52) U.S. Cl.
CPC ............ *F16D 7/024* (2013.01); *F16D 2300/10* (2013.01); *F05B 2230/608* (2013.01); *F05B 2260/402* (2013.01); *F16H 1/28* (2013.01); *F05C 2253/12* (2013.01); *F05C 2201/0466* (2013.01); *Y02E 10/722* (2013.01); *F03D 11/02* (2013.01); *F05B 2260/40311* (2013.01); *F05B 2280/6011* (2013.01); *F03D 11/0008* (2013.01)
USPC ...................................................... 416/170 R

(58) Field of Classification Search
USPC ............ 415/122.1, 216.1; 416/170 R, 244 R, 416/244 A
See application file for complete search history.

(56) References Cited

U.S. PATENT DOCUMENTS

| 2,879,092 | A | * | 3/1959 | Grobel et al. | ................. | 403/337 |
| 4,757,211 | A | * | 7/1988 | Kristensen | ...................... | 290/55 |
| 4,822,204 | A | * | 4/1989 | Lindenthal | ..................... | 403/337 |
| 6,176,804 | B1 | * | 1/2001 | Kekki et al. | ................... | 475/331 |

(Continued)

FOREIGN PATENT DOCUMENTS

| DE | 3237096 A1 | * | 4/1984 |
| EP | 0 386 652 | | 9/1990 |

(Continued)

OTHER PUBLICATIONS

European Search Report dated Sep. 3, 2008, from corresponding European application.

*Primary Examiner* — Edward Look
*Assistant Examiner* — Jesse Prager
(74) *Attorney, Agent, or Firm* — Young & Thompson

(57) ABSTRACT

A method for connecting a low speed main shaft of a wind turbine to an input shaft of a transmission gearbox of the wind turbine is disclosed. The method includes providing a connection surface on the main shaft and a corresponding connection surface on the input shaft, placing a friction enhancing means on at least one of the connection surfaces, and firmly connecting both connection surfaces to one another, a permanent load being applied on the connection surfaces.

18 Claims, 4 Drawing Sheets

(56) References Cited

U.S. PATENT DOCUMENTS

| | | | | |
|---|---|---|---|---|
| 6,347,905 | B1 * | 2/2002 | Lukschandel | 403/404 |
| 6,833,632 | B2 * | 12/2004 | Becker et al. | 290/55 |
| 8,167,575 | B2 * | 5/2012 | Eusterbarkey | 416/244 R |
| 2003/0102677 | A1 | 6/2003 | Becker et al. | |

FOREIGN PATENT DOCUMENTS

| | | |
|---|---|---|
| EP | 1 251 268 | 10/2002 |
| FR | 2 367 943 | 5/1978 |
| WO | 03/037608 | 5/2003 |

* cited by examiner

METHOD FOR CONNECTING A LOW SPEED MAIN SHAFT OF A WIND TURBINE TO AN INPUT SHAFT OF A TRANSMISSION GEARBOX OF THE WIND TURBINE AND A CONNECTION OBTAINED BY SAID METHOD

BACKGROUND OF THE INVENTION

1. Field of the Invention

The present invention relates to a method for connecting a low speed main shaft of a wind turbine to an input shaft of a transmission gearbox of the wind turbine.

2. Description of the Related Art

The purpose of such a connection between the main shaft and the input shaft of a transmission gearbox is to transmit torque from the main shaft which is connected to the rotor hub of the wind turbine and which is driven usually at a slow speed by the action of the wind on the rotor blades to an input shaft of the transmission gearbox.

Hereby, the slow rotation of the input shaft is transformed in the transmission gearbox into a fast rotation at the output shaft of the transmission gearbox, which output shaft is normally driving an electric power generator.

According to the present state of the art a lot of different methods for connecting a main shaft of a wind turbine to an input shaft of a transmission gearbox are known.

The present invention however is limited to the types of methods of connecting whereby the transfer of torque through the connection is realized based on the principles of friction between materials.

In recent developments there is a tendency to design wind turbines of multi megawatts, for instance 3 MW, having growing dimensions.

In order to cope with the loads on such wind turbines with big dimensions, a lot of effort is put in integrating the different components of the wind turbine in order to reduce the weight and size of the wind turbine.

In particular in new designs the whole drive train is of a more and more integrated type.

Growing dimensions combined with more integrated designs make the transmission of torque from the main shaft to the input shaft problematic.

Indeed, the bigger the dimensions of the wind turbine, the higher the torque to be transmitted, whereby on the other hand the limited dimensions of the integrated designs, in particular the limitations on the diameter used for the connection between the low speed main shaft and the input shaft of the gear box, also limit the maximum torque that can be transmitted.

This is in particular a disadvantage of the existing drive trains using a connection between main shaft and input shaft of the gear box based on the principles of friction.

The present invention aims at a method for connecting the low speed main shaft of a wind turbine to an input shaft of a gearbox of that wind turbine, which does not show one or more of the above and other disadvantages.

BRIEF SUMMARY OF THE INVENTION

To this aim, the invention relates to a method for connecting a low speed main shaft of a wind turbine to an input shaft of a transmission gearbox of the wind turbine, whereby the method consists of providing a connection surface on the main shaft and a corresponding connection surface on the input shaft; placing a friction enhancing means on at least one of said connection surfaces; and firmly connecting both connection surfaces to one another by means of pre-tensioning means, whereby a permanent load on the connection surfaces is applied.

An important advantage of such a method for connecting the main shaft and an input shaft of the wind turbine according to the present invention is that the friction enhancing means will augment the friction coefficient between the connection surfaces considerably (for example typically a friction coefficient of 0.5), so that the required torque between the shafts can be transmitted through the connection, the connection having dimensions which fall within the limits of an integrated design of a wind turbine.

Indeed, on the one hand, the bigger the wind turbines get, and so the rotor blades, the more torque has to be transmitted through the connection of the main shaft with the input shaft of the gearbox.

On the other hand, torque is the multiplication of distance and force, so that it is only possible to transmit a bigger torque by augmenting the transmitted force or the distance, in particular the radial distance between the rotor axis and the points of application of the force.

However, the designs being of the integrated type, there is not much space available to increase said distance, i.e. the diameter of the connection.

As a consequence the transmitted force needs to be increased.

But, when the connection between the main shaft and the input shaft is based on the principle of friction between the materials, also the force that can be transmitted is limited.

Indeed, essentially two parameters are involved in a connection based on friction, i.e. the friction coefficient of the connection surfaces, depending on the contact surfaces itself (roughness of the surfaces, hardness of the material, material type of the surfaces, ... ) and the normal load applied on the connection surfaces of the parts to be connected, whereby this normal load is limited by the material strength.

With the known methods for connecting a main shaft of a wind turbine to an input shaft of the gearbox, this friction coefficient of said connection surfaces is always very small, for example typically in the order of magnitude of 0.15, which is insufficient in order to transmit the required loads within the restricted limits of the dimensions of the recent designs.

This means that a good friction coefficient of the connection surfaces is required, which is obtained by the method proposed by the present invention.

According to a preferred embodiment of a method for connecting a low speed main shaft of a wind turbine to an input shaft of a transmission gearbox of the wind turbine in accordance with the present invention, said friction enhancing means consist of a shim that is coated with a friction enhancing powder and that is placed in between the connection surfaces.

This method is particularly advantageous since the placement of a shim is easy during mounting, while it also allows for an efficient dismantling of the connection.

According to a still more preferred embodiment of a method for connecting a low speed main shaft of a wind turbine to an input shaft of a transmission gearbox of the wind turbine in accordance with the present invention, the above-mentioned friction enhancing powder contains grains of diamond.

This particular embodiment of a method in accordance with the present invention has the advantage that the friction coefficient can be extremely augmented, whereby the quality of the connection obtained is very good, since diamond particles are very hard and will not easily wear after some time during torque transmission, as some other materials do.

What's more, since the diamond grains are very hard, they can penetrate in the connection surfaces under the permanent normal load applied on said connection surfaces by the pre-tensioning means.

The invention does not only regard a method for connecting a main shaft and an input shaft of a wind turbine, but also regards a connection obtained by such a method.

In particular, the invention also relates to a connection of a low speed main shaft of a wind turbine and an input shaft of a transmission gearbox of said wind turbine, whereby the connection comprises a connection surface on the low speed main shaft and a corresponding connection surface on the input shaft, which surfaces are connected to one another by pre-tensioning means, whereby a permanent load on the connection surfaces is applied and whereby in between the connection surfaces friction enhancing means are provided.

Such a connection will have an increased friction coefficient between the connection surfaces and is therefore suitable for transmission of higher torques than the known connections, which is very useful for example in a wind turbine of the more integrated type.

BRIEF DESCRIPTION OF THE DRAWINGS

With the intention of better showing the characteristics of the invention, hereafter, as an example without any restrictive character whatsoever, some preferred forms of embodiment of a connection according to the present invention, obtained by a method in accordance with the present invention, are described, with reference to the accompanying drawings, wherein.

DETAILED DESCRIPTION OF THE PREFERRED EMBODIMENTS

Figure 1:
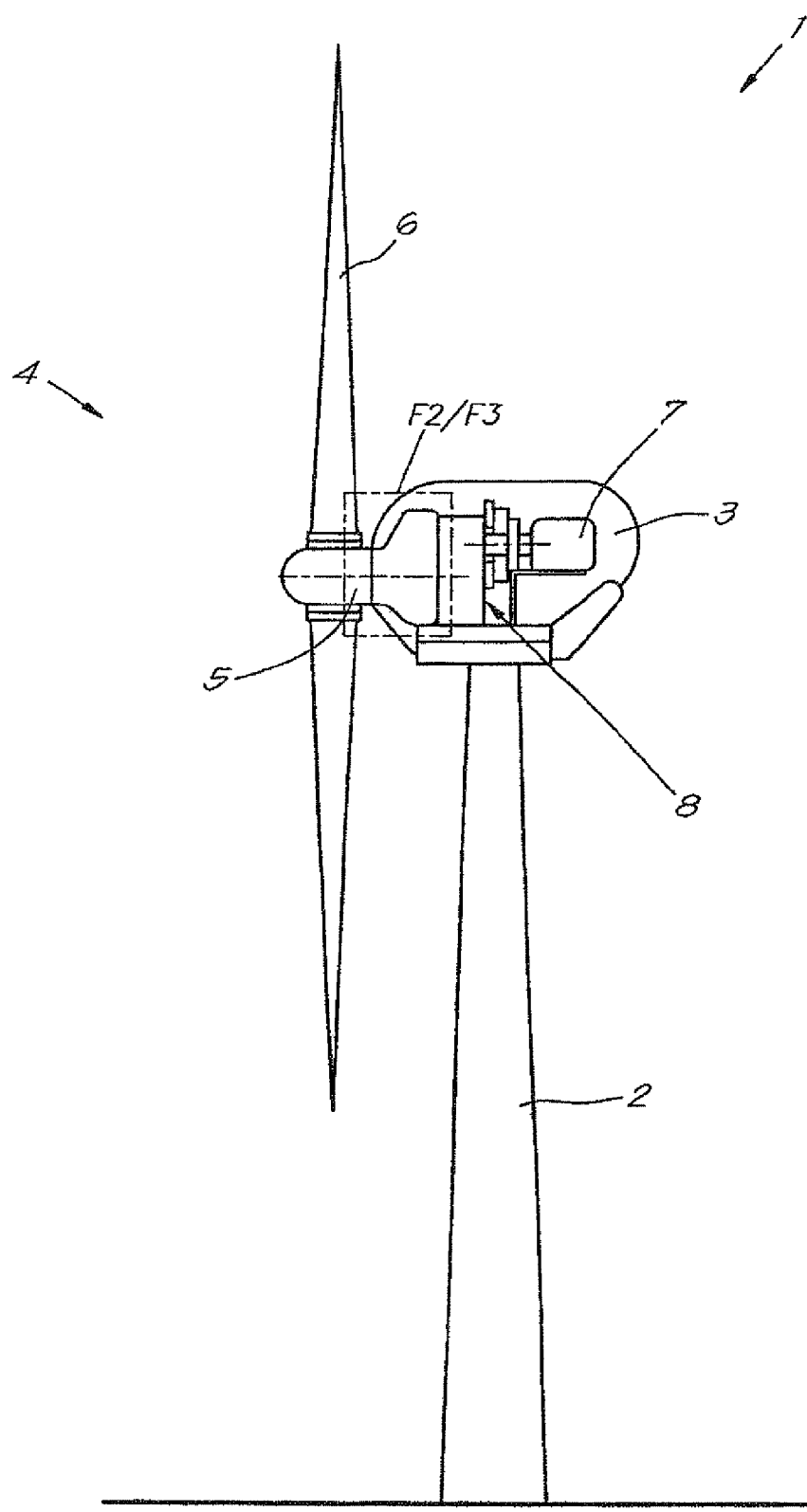
FIG. 1 schematically represents a side view of a typical wind turbine in which a connection in accordance with the present invention is integrated, the connection being obtained by a method in accordance with the present invention.

The typical wind turbine 1 represented in FIG. 1 consists of a static supporting structure 2 on which a nacelle 3 is mounted rotatably around a vertical axis, which allows for the adjustment of the position of the wind turbine 1 to the wind direction.

In the nacelle 3 a rotor 4 with a rotor hub 5 and with rotor blades 6 is provided, whereby the rotor hub 5 is connected to an electrical power generator 7 through a transmission gearbox 8.

Figure 2:
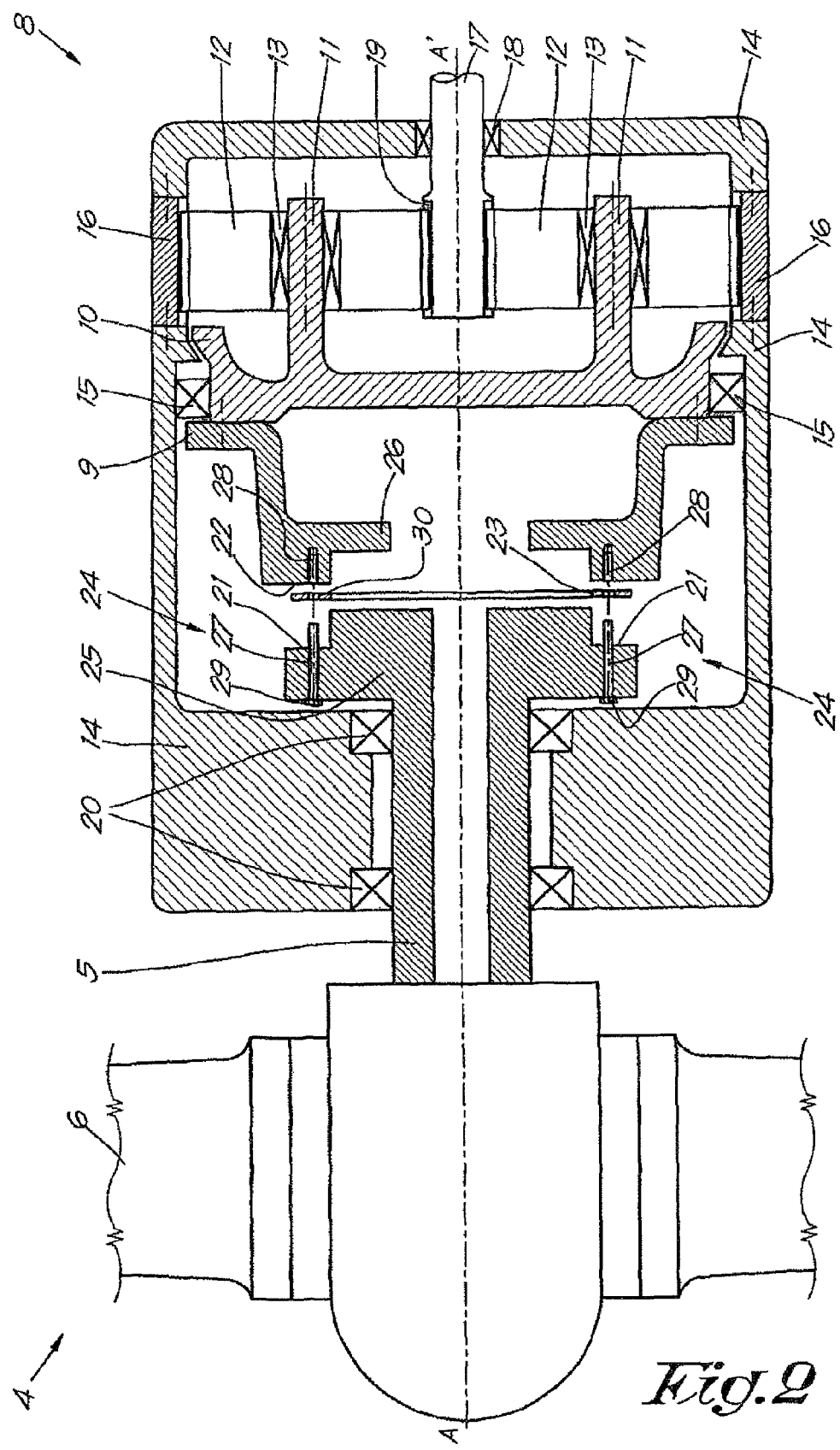
FIGS. 2 and 3 represent on a bigger scale the part of the wind turbine indicated by F2 in FIG. 1, respectively before and after the realisation of a connection in accordance with the present invention; and, FIG. 4 represents on a bigger scale the connection part indicated by F4 in FIG. 3.
Figure 3:
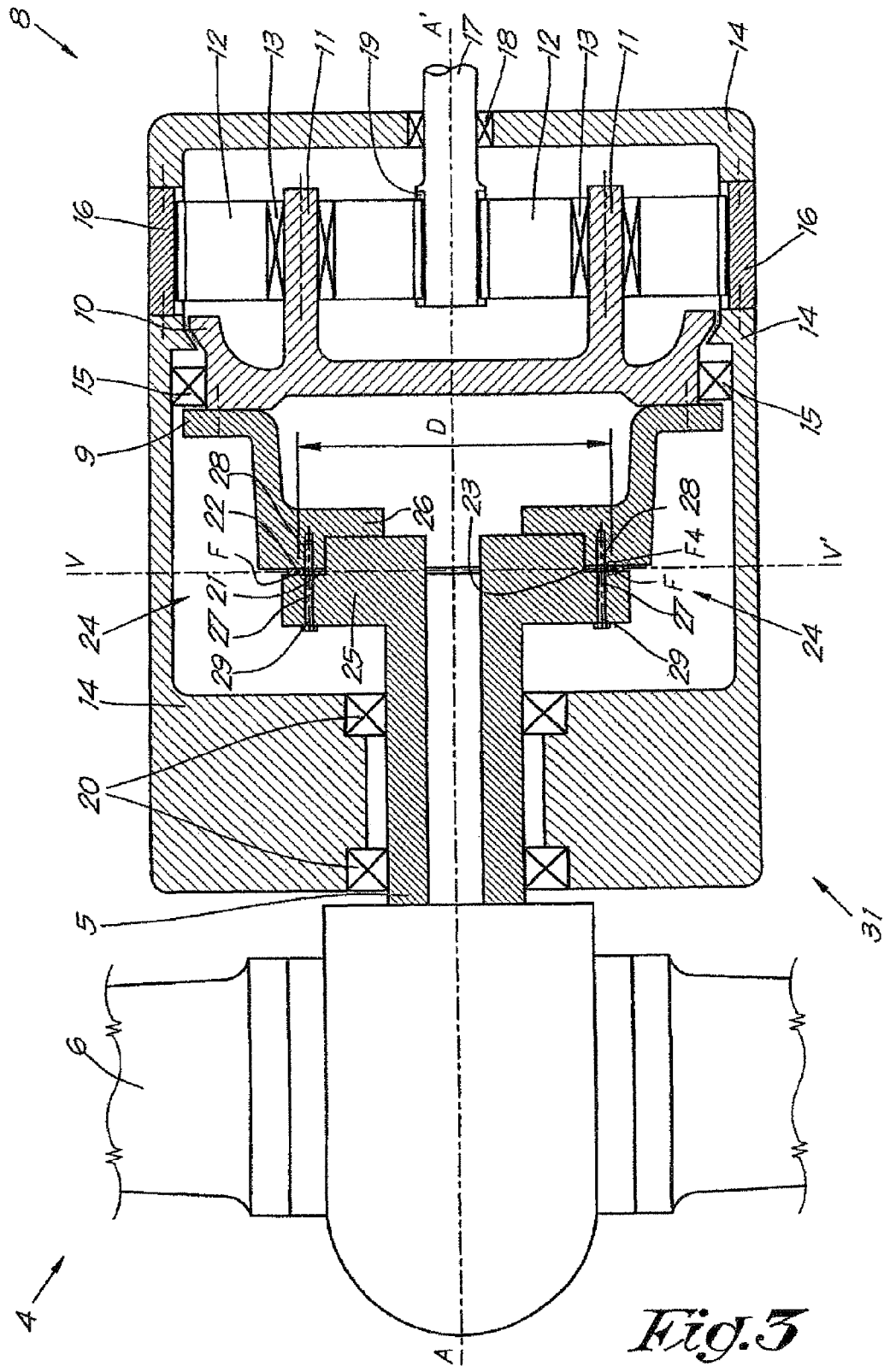

As is shown in FIGS. 2 and 3, respectively before and after connecting the rotor hub 5 on the transmission gearbox 8, the gearbox 8 contains in this case a planetary gear stage.

The input shaft 9 of the gearbox 8 is mounted on the planet carrier 10 of the planetary gear stage, the planet carrier 10 having planet shafts 11 on which planet wheels 12 are rotatably mounted by means of planet bearings 13.

The planet carrier 10 is also rotatably mounted with regard to the housing 14 of the gearbox 8 and wind turbine 1 by means of planet carrier bearings 15.

In that housing 14 a ring wheel 16 is mounted fixedly by means of bolts or other connection means.

The output shaft 17 of the gearbox 8 is connected to a generator 7 (not shown in the FIGS. 2 and 3) or for example to a next stage of the gearbox and is for example mounted rotatably in the housing 14 by means of output shaft bearings 18.

Furthermore, the output shaft 17 is provided with a sun wheel 19.

It is known that by the interaction of the planet wheels 12 with, on the one hand, the ring wheel 16 and, on the other hand, with the sun wheel 19, the slow rotation of the planet carrier 10 and input shaft 9 is transformed in a fast rotation of the output shaft 17.

Hence, when applied in a wind turbine 1 as shown in the FIGS. 1 to 3, the slow rotation of the rotor blades 6 is transformed in a sufficiently fast rotation at the output shaft 17 of the gear unit 8 for a proper functioning of the electrical power generator 7.

Hereby, the rotor hub 5 is mounted rotatably in the housing 14 by means of rotor bearings 20, the rotor hub 5 representing the slow speed main shaft 5 of the wind turbine 1.

It is clear that a connection between the rotor hub 5 or the slow speed main shaft 5 and the input shaft 9 of the transmission gearbox 8 is needed in order to be able to transfer torque from the rotor blades 6 to the output shaft 17.

The present invention provides a method for connecting these parts, which is enhanced with regard to the state of the art, since it allows for a higher torque transmission, so that the dimensions of the wind turbine drive train can be kept within certain limits.

In the most general wordings the method according to the present invention can be described as follows.

A first step consists in providing a connection surface 21 on the low speed main shaft 5 and a corresponding connection surface 22 on the input shaft 9 of the gearbox 8.

In another step of the method according to the present invention a friction enhancing means 23 is placed on at least one of said connection surfaces 21 or 22.

In still another step of the method according to the present invention both connection surfaces 21 and 22 are connected to one another by means of pre-tensioning means 24, whereby a permanent load on the connection surfaces 21 and 22 is applied.

In the particular case of FIGS. 2 and 3 the connection surfaces 21 and 22 are opposing faces, respectively on a flange 25 provided at the axially inner most side of the low speed main shaft 5 and on a collar 26 on the input shaft 9 at the axial side towards the rotor 4.

Hereby, the flange 25 and the collar 26 form each other's complement, the flange 25 being a male part and the collar 26 being a female part, so that by simple movement of flange 25 and collar 26 in an axial direction AA' towards one another the male part can be slid into the female part.

Furthermore, the friction enhancing means 23 consist in the represented case of a shim 23 that is coated with a friction enhancing powder and that is placed in between the connection surfaces 21 and 22.

Through flange 25 holes 27 are provided which are distributed evenly around the circumference of the flange 25.

Corresponding to these holes 27, also threaded holes 28 are provided in the collar 26.

Bolts 29 can be provided through holes 27, which can be screwed into the threaded holes 28 in collar 26.

Preferably, the shim 23 is also provided with holes 30, so that the bolts 29 also can pass through the shim 23, hereby providing a guidance for the positioning of the shim 23 as well as an extra security by preventing the shim 23 from turning with regard to the connection surfaces 21 and 22.

The bolts 29 and holes 27 and 28 form pre-tensioning means 24 by which a bolted pre-tensioned joint can be obtained in order to connect the connection surfaces 21 and 22, hereby applying a permanent load on the connection surfaces 21 and 22.

A lot of different other ways of realizing a pre-tensioned joint between the connection surfaces 21 and 22 are not excluded according to the present invention.

For example, instead of threaded holes 26, nuts could be used. Also the use of studs is not excluded or whatever other pre-tensioning means 24.

In FIG. 3 a connection 31 between a low speed main shaft 5 of a wind turbine 1 and an input shaft 9 of a transmission gearbox 8 of the wind turbine 1 according to the invention is represented, which connection 31 has been realized by application of the above-mentioned method in accordance with the present invention.

The connection 31 comprises a connection surface 21 on the low speed main shaft 5 and a corresponding connection surface 22 on the input shaft 9 which surfaces 21 and 22 are pressed together by the pre-tensioning means 24, whereby in between the connection surfaces 21 and 22 a friction enhancing means 23 is provided.

Figure 4:
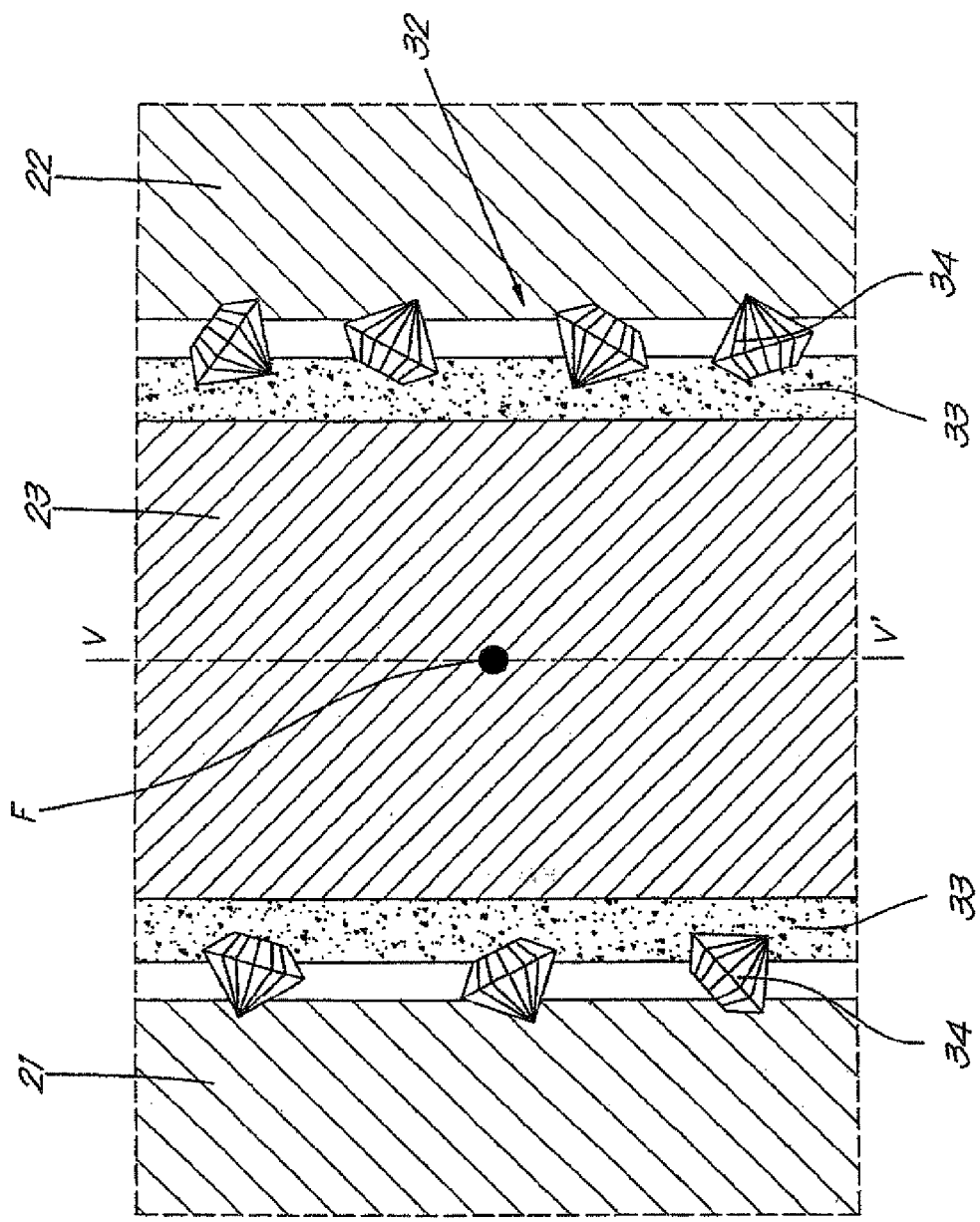

As is shown in more detail in FIG. 4, the friction enhancing means 23 consist of a shim 23 that is installed in between the connection surfaces 21 and 22, whereby the shim 23 is provided with a coating 31.

In this example the shim 23 is disc shaped with an internal diameter large enough in order to allow the shim 23 to be passed over the male part of the flange 25.

However, other shapes are not excluded.

According to a preferred embodiment of a connection 31 in accordance with the present invention, the shim 23 is made of a metal, whereby the coating 32 consists of a matrix 33, for example a nickel alloy, that is applied on the surface of the shim 23 and whereby the matrix 33 is holding grains 34 of a friction enhancing powder providing a rough surface on the shim 23.

Preferably said friction enhancing powder contains grains 34 of diamond.

This embodiment of a connection in accordance with the present invention is particularly interesting, since grains of diamond 34 are very hard and are able to penetrate the surfaces 21 and 22 after connecting and pre-tensioning by the pre-tensioning means 24.

In that way a very good friction coefficient between the surfaces 21 and 22 is obtained.

The combination of a good friction coefficient with a sufficient normal load on the surfaces 21 and 22, applied by the pre-tensioning means 24, augments the ability of the connection 31 of transmitting forces F acting in a direction in a plane VV' parallel to the connection surfaces 21 and 22 between said connection surfaces 21 and 22.

As explained in the introduction, a torque around the axis of rotation AA' of the wind turbine 1 is the multiplication of a certain force F in said plane VV' by the distance D between the line on which that force is acting and the axis of rotation AA'.

Since in a connection 30 according to the present invention the ability of transmitting forces F in a plane VV' is enhanced, also the ability of transmitting torque is therefore augmented.

For example, the maximum torque around the rotation axis AA' that can be transmitted between connection surfaces 21 and 22 having a certain average diameter D, before the connection will fail due to a lack of friction under a fixed applied normal load between the surfaces 21 and 22, will be much bigger for a connection 31 according to the present invention than for the known connections, whereby no friction enhancing means 23 are applied.

Or, explained from a point of view concerning the dimensions of the connection, for a same maximum torque to be transmitted by the connection, a connection 31 according to the present invention can be designed with a smaller average diameter D of the connection surfaces 21 and 22, than the known connections without friction enhancing means 23.

Hence, a connection 31 according to the present invention is much more suitable for application in wind turbines 1 of the more integrated type, since in such designs the dimensions of the connection are preferably kept as small as possible.

The examples shown in the FIGS. 1 to 4 are not limitative.

For example, it is not excluded to use a method in accordance to the invention whereby a coating 32 is directly applied on at least one of the connection surfaces 21 or 22, the coating 32 containing a friction enhancing powder 34.

It is also not excluded according to the invention to use a friction enhancing powder containing other grains 34 than diamond grains.

The particular shape of the connection surfaces 21 and 22 can also be completely different.

It is for example possible to execute the flange 25 and collar 26, respectively on the main shaft 5 and the input shaft 9, as complementary shapes, the flange 25 being a female part and the collar 26 being a male part.

It is also not necessary to provide a flange 25 and/or a collar 26; other shapes are not excluded.

The present invention is in no way limited to the embodiments described above and represented in the drawings, but such a connection 31 may be realised in different shapes and dimensions, using a method according to the invention which is different from the above-described, without departure from the scope of the invention.

The invention claimed is:

1. A method for connecting a low speed main shaft of a wind turbine to an input shaft of a transmission gearbox of the wind turbine, the method comprising:
   providing a connection surface on the main shaft and a corresponding connection surface on the input shaft, the connection surfaces being opposing surfaces, respectively, at an axially innermost side of the low speed main shaft, and on the input shaft at an axial side toward a rotor of the wind turbine, the connection surfaces of the main shaft and the input shaft being configured to be pressed together, the connection surfaces being opposing front faces at which the main shaft and the input shaft come together in a connected state;
   providing a friction enhancing means on at least one of said connection surfaces, the friction enhancing means comprising a coating comprising a friction enhancing powder containing diamond grains; and
   firmly connecting both connection surfaces with one another by a pre-tensioning means by applying a permanent load on the connection surfaces, application of the permanent load causing the diamond grains of the friction enhancing means to penetrate the connection surfaces,
   wherein the friction enhancing means is provided in between both of the connection surfaces and is configured to contact both of the connection surfaces in the connected state of the main shaft and the input shaft to provide an increased friction coefficient between the connection surfaces in relation to a friction coefficient between the connection surfaces without the friction enhancing means.

2. The method according to claim 1, wherein the friction enhancing means comprises a shim that is coated with the friction enhancing powder, the shim being placed in between the connection surfaces.

3. The method according to claim 1, wherein the coating is directly applied on at least one of the connection surfaces.

4. The method according to claim 1, wherein the connection surfaces are connected to one another by a bolted pre-tensioned joint comprising one or more of bolts, nuts, studs, and pretension means.

5. The method according to claim 1, wherein the low speed main shaft is a rotor hub of the wind turbine.

6. The method according to claim 1, wherein the transmission gearbox of the wind turbine comprises a planetary gear system with a planet carrier which forms the input shaft of the transmission gearbox.

7. A connector of a low speed main shaft of a wind turbine and an input shaft of a transmission gearbox of said wind turbine, the connector comprising:
   a connection surface on the low speed main shaft at an axially innermost side of the low speed main shaft;
   a corresponding connection surface on the input shaft at an axial side toward a rotor of the wind turbine, the corresponding connection surface being an opposing surface to the connection surface on the main shaft, the connection surfaces of the input shaft and the main shaft being configured to be pressed together, the connection surfaces being opposing front faces at which the main shaft and the input shaft come together in a connected state;
   pre-tensioning means configured to press together the connection surfaces by applying a permanent load on the connection surfaces; and
   friction enhancing means provided in between both of the connection surfaces, the friction enhancing means comprising a coating comprising a friction enhancing powder containing diamond grains, application of the permanent load by the pre-tensioning means causing the diamond grains of the friction enhancing means to penetrate the connection surfaces,
   wherein the friction enhancing means is configured to contact both of the connection surfaces in the connected state of the main shaft and the input shaft to provide an increased friction coefficient between the connection surfaces in relation to a friction coefficient between the connection surfaces without the friction enhancing means.

8. The connector according to claim 7, wherein the coating containing the friction enhancing powder is applied directly on one of the connection surfaces or on a shim that is installed in between the connection surfaces.

9. The connector according to claim 7, wherein the low speed main shaft is a rotor hub of the wind turbine, and the input shaft is a planet carrier of a planetary system in the transmission gearbox of the wind turbine.

10. The method according to claim 2, wherein the coating is directly applied on at least one of the connection surfaces.

11. The method according to claim 2, wherein the connection surfaces are connected to one another by a bolted pre-tensioned joint comprising one or more of bolts, nuts, studs, and pretension means.

12. The method according to claim 3, wherein the connection surfaces are connected to one another by a bolted pre-tensioned joint comprising one or more of bolts, nuts, studs, and pretension means.

13. The method according to claim 2, wherein the low speed main shaft is a rotor hub of the wind turbine.

14. The method according to claim 3, wherein the low speed main shaft is a rotor hub of the wind turbine.

15. The method according to claim 4, wherein the low speed main shaft is a rotor hub of the wind turbine.

16. The method according to claim 4, wherein the transmission gearbox of the wind turbine comprises a planetary gear system with a planet carrier which forms the input shaft of the transmission gearbox.

17. A method for connecting a low speed main shaft of a wind turbine to an input shaft of a transmission gearbox of the wind turbine, the method comprising:
   providing a connection surface on the main shaft and a corresponding connection surface on the input shaft, the connection surfaces being opposing surfaces, respectively, at an axially innermost side of the low speed main shaft, and on the input shaft at an axial side toward a rotor of the wind turbine, the connection surfaces of the main shaft and the input shaft being configured to be pressed together, the connection surfaces being opposing front faces at which the main shaft and the input shaft come together in a connected state;
   providing a shim on at least one of said connection surfaces, the shim comprising a coating comprising a friction enhancing powder contains diamond grains; and
   firmly connecting both connection surfaces with one another by a pre-tensioning system provided between the connection surfaces by applying a permanent load on the connection surfaces, application of the permanent load causing the diamond grains of the friction enhancing powder to penetrate the connection surfaces,
   wherein the shim is provided in between both of the connection surfaces and is configured to contact both of the connection surfaces in the connected state of the main shaft and the input shaft to provide an increased friction coefficient between the connection surfaces in relation to a friction coefficient between the connection surfaces without the shim.

18. The method according to claim 1, wherein the main shaft is of a size sufficient to support rotor blades of the wind turbine.

* * * * *